United States Patent
Gattere et al.

(10) Patent No.: US 12,486,161 B2
(45) Date of Patent: Dec. 2, 2025

(54) DETECTION STRUCTURE FOR A MEMS ACCELEROMETER HAVING IMPROVED PERFORMANCES AND MANUFACTURING PROCESS THEREOF

(71) Applicant: STMICROELECTRONICS S.r.l., Agrate Brianza (IT)

(72) Inventors: Gabriele Gattere, Castronno (IT); Francesco Rizzini, Passirano (IT); Federico Vercesi, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 323 days.

(21) Appl. No.: 18/334,296

(22) Filed: Jun. 13, 2023

(65) Prior Publication Data
US 2024/0010490 A1    Jan. 11, 2024

(30) Foreign Application Priority Data
Jul. 11, 2022    (IT) ..................... 102022000014548

(51) Int. Cl.
*B81C 1/00*    (2006.01)
*B81B 7/02*    (2006.01)

(52) U.S. Cl.
CPC ............ *B81B 7/02* (2013.01); *B81C 1/00198* (2013.01); *B81B 2201/0235* (2013.01);
(Continued)

(58) Field of Classification Search
CPC .............. B81B 7/02; B81B 2201/0235; B81B 2203/0307; B81B 2203/033;
(Continued)

(56) References Cited

U.S. PATENT DOCUMENTS 6,360,605 B1 *   3/2002   Pinter ................... B81B 3/0051
                                                        73/514.32
7,078,778 B2 *   7/2006   Schenk ................. G01P 15/125
                                                        438/50
(Continued)

FOREIGN PATENT DOCUMENTS

CN     107132372 A    9/2017
EP       1832841 A1   9/2007

*Primary Examiner* — David J Bolduc
(74) *Attorney, Agent, or Firm* — Seed Intellectual Property Law Group LLP

(57) ABSTRACT

The detection structure for a MEMS accelerometer is formed by a substrate; a first movable mass and a second movable mass which extend at a distance from each other, suspended on the substrate and which are configured to undergo a movement, with respect to the substrate, in response to an acceleration. The detection structure also has a first movable electrode integral with the first movable mass; a second movable electrode integral with the second movable mass; a first fixed electrode integral with the substrate and configured to form, with the first movable electrode, a first variable capacitor; and a second fixed electrode integral with the substrate and configured to form, with the second movable electrode, a second variable capacitor. The detection structure has an insulation region, of electrically insulating material, which is suspended on the substrate and extends between the first movable mass and the second movable mass.

20 Claims, 13 Drawing Sheets

(52) U.S. Cl.
CPC . *B81B 2203/0307* (2013.01); *B81B 2203/033* (2013.01); *B81B 2203/04* (2013.01); *B81B 2203/06* (2013.01); *B81B 2207/015* (2013.01); *B81C 2201/014* (2013.01); *B81C 2203/0707* (2013.01)

(58) Field of Classification Search
CPC ............ B81B 2203/04; B81B 2203/06; B81B 2207/015; B81C 1/00198; B81C 2201/014; B81C 2203/0707; G01P 2015/0831; G01P 15/125
See application file for complete search history.

(56) References Cited

U.S. PATENT DOCUMENTS

| | | | |
|---|---|---|---|
| 10,274,512 B2* | 4/2019 | Tocchio | ................ G01P 15/125 |
| 11,143,670 B2 | 10/2021 | Choi et al. | |
| 2008/0190198 A1 | 8/2008 | Prandi et al. | |
| 2009/0139331 A1* | 6/2009 | Axelrod | ................... G01P 15/18 |
| | | | 73/514.32 |
| 2010/0213791 A1* | 8/2010 | Kandori | ............. G01C 19/5719 |
| | | | 310/309 |
| 2011/0197675 A1 | 8/2011 | Caminada et al. | |
| 2013/0229193 A1* | 9/2013 | Kakimoto | ............. B81B 3/0086 |
| | | | 324/661 |
| 2016/0091524 A1* | 3/2016 | Kamada | ................ G01P 15/125 |
| | | | 73/514.32 |
| 2018/0031601 A1 | 2/2018 | Anac et al. | |
| 2018/0297838 A1* | 10/2018 | Kautzsch | ............ B81C 1/00246 |
| 2020/0216310 A1 | 7/2020 | Hocking et al. | |
| 2021/0215735 A1* | 7/2021 | Tseng | ........................ G01P 1/00 |
| 2021/0367536 A1* | 11/2021 | Zhou | ..................... B81B 7/008 |
| 2022/0390483 A1 | 12/2022 | Zhang et al. | |
| 2023/0028797 A1* | 1/2023 | Gattere | ...................... G01P 1/00 |
| 2024/0391757 A1 | 11/2024 | Garbarino et al. | |

* cited by examiner ial design for any MEMS accelerometer page...

DETECTION STRUCTURE FOR A MEMS ACCELEROMETER HAVING IMPROVED PERFORMANCES AND MANUFACTURING PROCESS THEREOF

BACKGROUND

Technical Field

The present disclosure relates to a detection structure for a MEMS accelerometer having improved performances and to a manufacturing process thereof.

Description of the Related Art

As is known, accelerometers made using MEMS ("Micro Electro-Mechanical Systems") technology are widely spread owing to their small dimensions and high detection sensitivity.

MEMS accelerometers are known having, for each detection direction, a detection structure comprising a single movable mass suspended on a substrate. The movable mass is free to move with respect to the substrate, along the detection direction.

The movable mass is capacitively coupled to one or more stator electrodes, fixed to the substrate, thus forming one or more variable capacitors, having a rest capacitance.

In use, when the MEMS accelerometer is subject to an acceleration along the detection direction, the movable mass moves with respect to the rest position, thus varying the capacitance of the variable capacitors with respect to the rest condition.

In order to measure this capacitance variation, it is known to incorporate, in the MEMS accelerometer, a dedicated common mode signal cancellation circuit, as described for example in U.S. Pat. No. 11,143,670 B2.

However, the presence of a dedicated common mode signal cancellation circuit entails a high energy consumption of the MEMS accelerometer.

According to another approach, a MEMS accelerometer has a detection structure comprising, for each detection direction, a first and a second movable mass suspended on a substrate and free to move, with respect to the substrate, along the detection direction.

The first and the second movable masses are mechanically decoupled and electrically insulated from each other.

The first movable mass forms a first rotor electrode coupled to a first stator electrode, fixed to the substrate, and the second movable mass forms a second rotor electrode coupled to a second stator electrode, fixed to the substrate.

The first and the second stator electrodes are electrically connected to each other.

In use, a drive circuit provides a first reading signal to the first movable mass and a second reading signal to the second movable mass. The second reading signal is phase-shifted by 180° with respect to the first reading signal.

In this manner, the known MEMS accelerometer provides an acceleration detection signal wherein the common mode signal is canceled at die level, without using a specific common mode signal cancellation circuit.

However, the Applicant has verified that such known MEMS accelerometers with double movable mass are subject to acceleration detection errors. In detail, the Applicant has verified that the detection signal provided by the known MEMS accelerometer has a low stability as a function of temperature, even in the absence of an external acceleration.

Therefore, known MEMS accelerometers have a low detection reliability.

BRIEF SUMMARY

According to the present disclosure a detection structure for a MEMS accelerometer, a manufacturing process of the detection structure and a MEMS accelerometer are thus provided. A detection structure for a MEMS accelerometer that includes a first movable mass and a second movable mass, extending at a distance separated from each other, suspended on the substrate and configured to undergo a movement, with respect to the substrate, in response to an acceleration. A first movable electrode is integral with the first movable mass and a second movable electrode integral with the second movable mass. A first fixed electrode is integral with the substrate and configured to form, with the first movable electrode, a first variable capacitor. A second fixed electrode integral with the substrate and configured to form, with the second movable electrode, a second variable capacitor and an insulation region, of electrically insulating material, suspended on the substrate and extending between the first movable mass and the second movable mass.

BRIEF DESCRIPTION OF THE SEVERAL VIEWS OF THE DRAWINGS

For a better understanding of the present disclosure, some embodiments thereof are now described, purely by way of non-limiting example, with reference to the attached drawings, wherein.

The following description refers to the arrangement shown; consequently, expressions such as "above," "below," "top," "bottom," "right," "left" relate to the attached figures and are not to be intended in a limiting manner.

DETAILED DESCRIPTION

Figure 1:
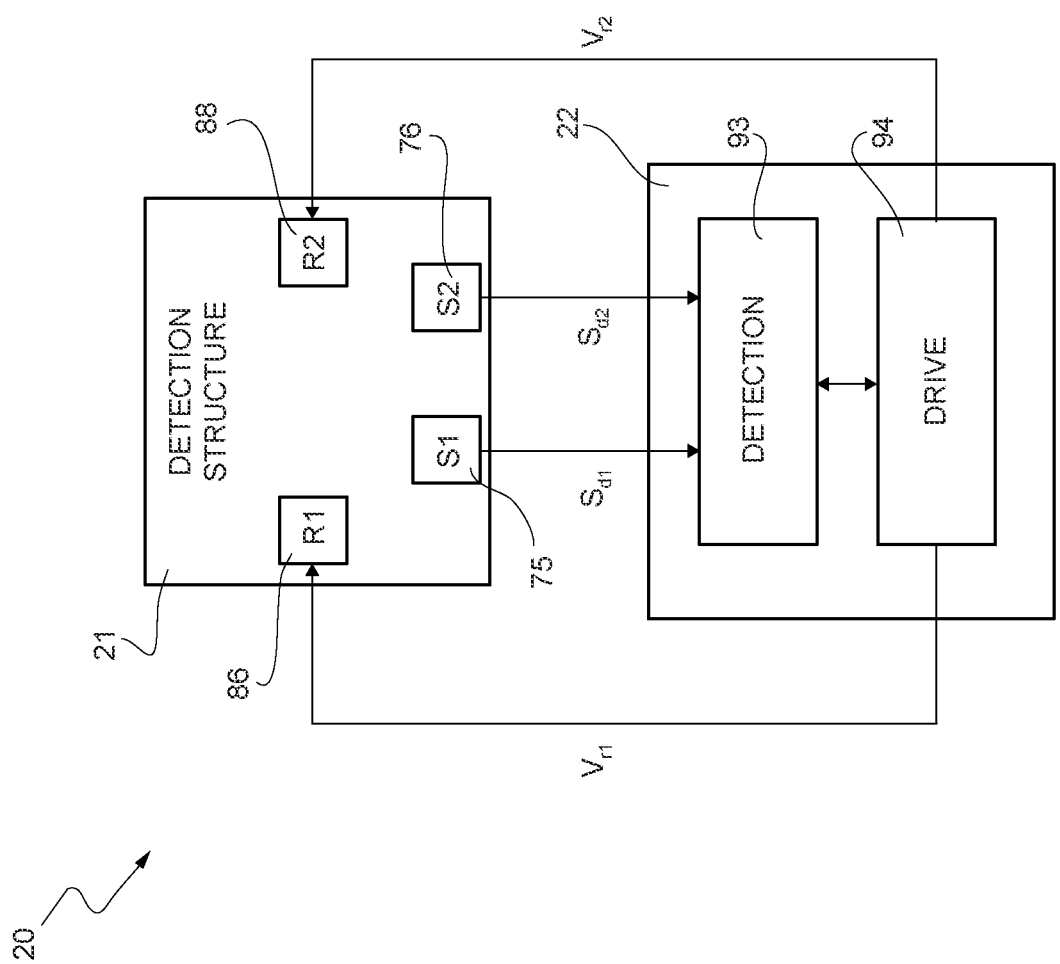
FIG. 1 shows a block diagram of the present MEMS accelerometer comprising a detection structure and a control unit.

FIG. 1 shows a block diagram of a MEMS accelerometer 20, here of monoaxial type, comprising a detection structure 21 and a control unit 22, mutually coupled.

Figure 2:
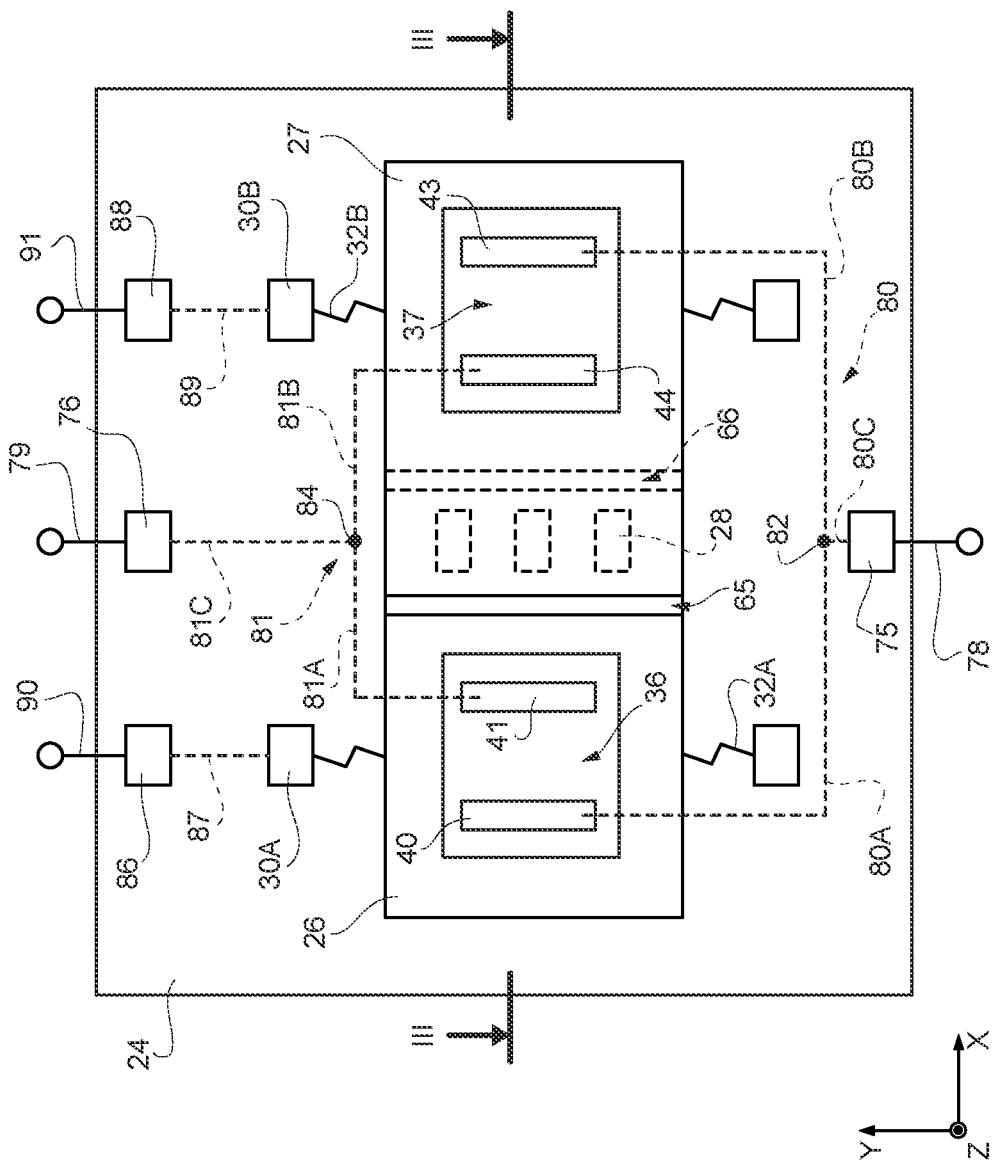
FIG. 2 shows a top-plan view of the detection structure of FIG. 1, according to an embodiment.
Figure 3:
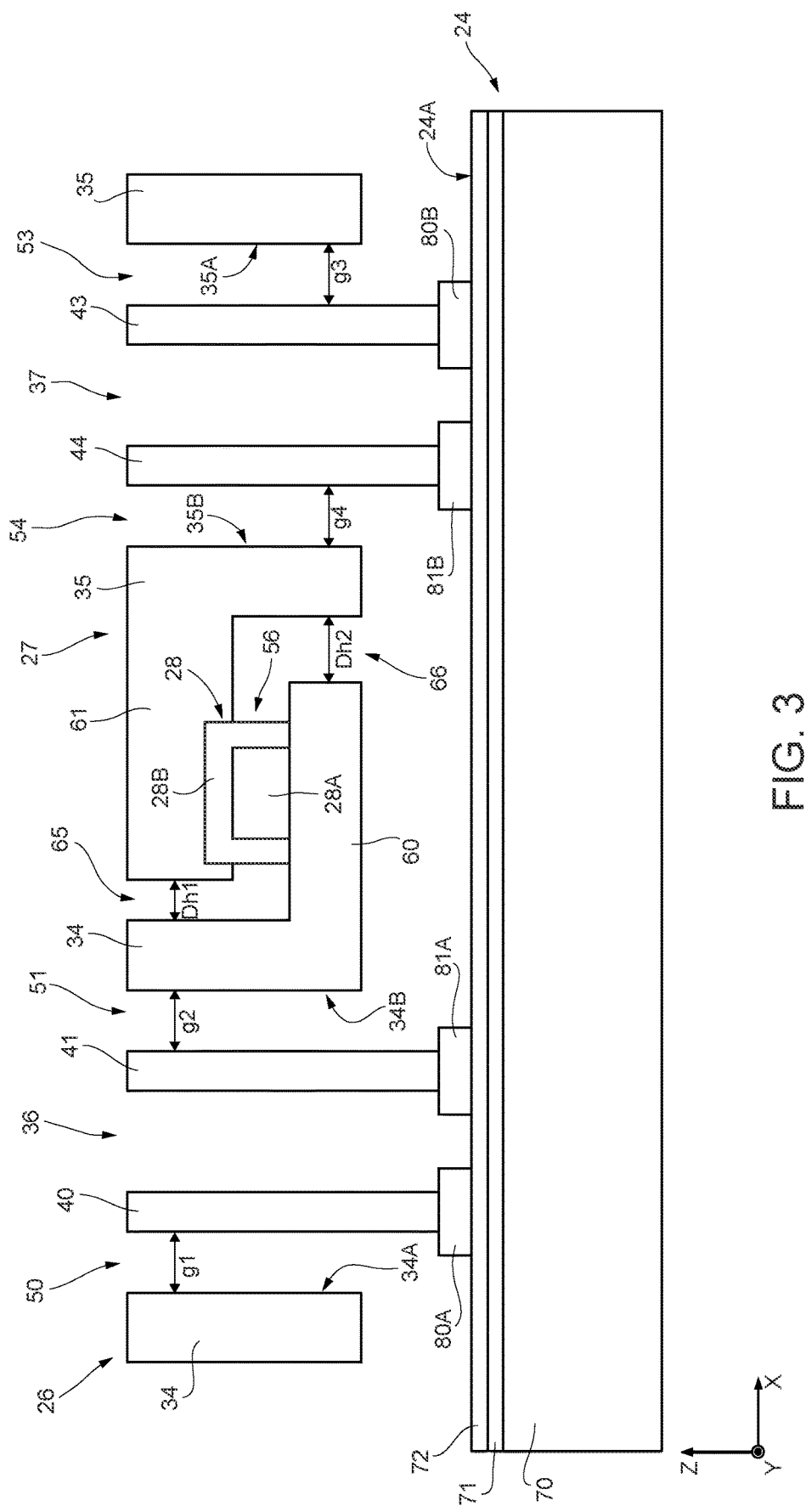
FIG. 3 shows a cross-section of the detection structure of FIG. 2, at rest, along a section line III-III of FIG. 2.

In detail, FIGS. 2 and 3 show an embodiment of the detection structure 21 in a Cartesian reference system XYZ comprising a first axis X, a second axis Y and a third axis Z.

The detection structure 21 is formed by using MEMS technology, through micromachining techniques, from a body of semiconductor material, for example silicon.

The detection structure 21 comprises a substrate or support structure 24, for example comprising silicon, and having a surface 24A, and a first and a second movable mass 26, 27, for example of silicon or polysilicon, suspended on the substrate 24.

The detection structure 21 further comprises one or more insulation regions, here three insulation regions 28, of electrically insulating material, which extend between the first movable mass 26 and the second movable mass 27.

In this embodiment, the insulation regions 28 mechanically couple, in particular rigidly, the first and the second movable masses 26, 27 to each other.

In practice, the first and the second movable masses 26, 27 are here integral with each other.

The first movable mass 26 and the second movable mass 27 are coupled to respective anchoring regions 30A, 30B, fixed to the substrate 24, through respective flexures 32A, 32B.

The flexures 32A, 32B, for example here of semiconductor material such as silicon or polysilicon, may be linear or folded elastic elements and are configured to allow the movement of the first and, respectively, of the second movable mass 26, 27 with one or more degrees of freedom, with respect to the substrate 24, in response to an acceleration.

In this embodiment, the flexures 32A, 32B are compliant along the first axis X and are rigid along the second and the third axes Y, Z, so as to allow the movement of the first and the second movable masses 26, 27, as a first approximation, only along the first axis X.

In detail, the flexures 32A each extend parallel to the second axis Y between the first movable mass 26 and a respective anchoring region 30A. The flexures 32B each extend parallel to the second axis Y between the second movable mass 27 and a respective anchoring region 30B.

The first and the second movable masses 26, 27 each have a respective detection portion 34, and a respective coupling portion 60, 61, contiguous to each other.

The detection portion 34 of the first movable mass 26 is substantially frame-shaped in top-plan view.

An opening 36, here substantially rectangular-shaped in top-plan view, extends through the detection portion 34 of the first movable mass 26, along the third axis Z, throughout the thickness of the detection portion 34.

In detail, the detection portion 34 of the first movable mass 26 has a first and a second internal wall 34A, 34B defining, on two sides, the opening 36.

In this embodiment, the first and the second internal walls 34A, 34B extend parallel to the second axis Y and form two sides of the opening 36 opposite to each other along the first axis X.

The detection portion 35 of the second movable mass 27 is substantially frame-shaped in top-plan view.

An opening 37, here substantially rectangular-shaped in top-plan view, extends through the detection portion 35 of the second movable mass 27, along the third axis Z, throughout the thickness of the detection portion 35.

In detail, the detection portion 35 of the second movable mass 27 has a first and a second internal wall 35A, 35B defining, on two sides, the opening 37.

In this embodiment, the first and the second internal walls 35A, 35B extend parallel to the second axis Y and form two sides of the opening 37 opposite to each other along the first axis X.

The detection structure 21 further comprises a first and a second stator electrode 40, 41 capacitively coupled to the first movable mass 26, and a third and a fourth stator electrode 43, 44 capacitively coupled to the second movable mass 27.

In detail, the first, the second, the third and the fourth stator electrodes 40, 41, 43, 44, for example of polysilicon, are integral with the substrate 24.

The first and the second stator electrodes 40, 41 are arranged inside the opening 36 of the first movable mass 26. In detail, the first and the second stator electrodes 40, 41 face respectively the first and the second internal walls 34A, 34B of the detection portion 34 of the first movable mass 26.

The third and the fourth stator electrodes 43, 44 are arranged inside the opening 37 of the second movable mass 27. In detail, the third and the fourth stator electrodes 43, 44 face respectively the first and the second internal walls 35A, 35B of the detection portion 35 of the second movable mass 27.

The first and the second internal walls 34A, 34B of the first movable mass 26 form a first and, respectively, a second rotor electrode. The first and the second internal walls 35A, 35B of the second movable mass 27 form a third and, respectively, a fourth rotor electrode.

In practice, the first stator electrode 40 and the first internal wall 34A of the first movable mass 26 form a first detection capacitor 50; and the second stator electrode 41 and the second internal wall 34B of the first movable mass 26 form a second detection capacitor 51.

The third stator electrode 43 and the first internal wall 35A of the second movable mass 27 form a third detection capacitor 53; and the fourth stator electrode 44 and the second internal wall of the second movable mass 27 form a fourth detection capacitor 54.

At rest, the first stator electrode 40 extends at a distance g1, along the first axis X, from the first internal wall 34A of the first movable mass 26; the second stator electrode 41 extends at a distance g2, along the first axis X, from the second internal wall 34B of the first movable mass 26. The third stator electrode 43 extends at a distance g3, along the first axis X, from the first internal wall 35A of the second movable mass 27; the second stator electrode 44 extends at a distance g4, along the first axis X, from the second internal wall 35B of the second movable mass 27.

For example, the distances g1-g4 may each be greater than 0.3 μm, in particular each comprised between 1 μm and 4 μm.

In this embodiment, the distances g1-g4 are equal to each other.

Furthermore, in this embodiment, the stator electrodes 40, 41, 43, 44 have a same facing area on the respective internal walls 34A, 34B, 35A, 35B.

Consequently, the detection capacitors 50, 51, 53, 54 have, at rest, a same rest capacitance $C_0$.

As mentioned above, the first and the second movable masses 26, 27 are mechanically coupled to each other through the insulation regions 28.

The insulation regions 28 each extend between the coupling portion 60 of the first movable mass 26 and the coupling portion 61 of the second movable mass 27.

The coupling portion 60 of the first movable mass 26 extends from the respective detection portion 34, parallel to the first axis X, towards the detection portion 35 of the second movable mass 27. The coupling portion 61 of the second movable mass 27 extends from the respective detection portion 35, parallel to the first axis X, towards the detection portion 34 of the first movable mass 26.

In detail, the coupling portion 60 of the first movable mass 26 and the coupling portion 61 of the second movable mass 27 extend at a distance from each other along the third axis Z; in practice, the coupling portions 60, 61 face each other along the third axis Z, forming a vertical gap 56.

The insulation regions 28 extend, along the third axis Z, in the vertical gap 56.

In the embodiment shown, the insulation regions 28 are each formed by a separation portion 28A and a coating portion 28B which coats the separation portion 28A.

The separation portion 28A and the coating portion 28B may be of materials etchable by different chemical species, as discussed hereinafter with reference to FIGS. 5-9. For example, the separation portion 28A may be an oxide, for example silicon oxide, and the coating portion 28B may be a nitride, for example silicon nitride.

In detail, the separation portion 28A has a bottom side extending in contact with the coupling portion 60 of the first movable mass 26.

The coating portion 28B laterally and upwardly covers the separation portion 28A.

The coupling portion 61 of the second movable mass 27 extends in direct contact with the coating portion 28B.

In detail, in this embodiment, the coating portion 28B partially extends also through the coupling portion 61 of the second movable mass 27.

In practice, the coupling portion 61 of the second movable mass 27 laterally covers a top part of the coating portion 28.

Furthermore, in this embodiment, the first and the second movable masses 26, 27 extend at a distance from each other along the first axis X.

In detail, a top gap 65 and a bottom gap 66 extend between the first and the second movable masses 26, 27.

The top gap 65 extends between the coupling portion 61 of the second movable mass 27 and the detection portion 34 of the first movable mass 26, thus separating them from each other.

The top gap 65 has a width Dh1 along the first axis X, for example comprised between 0.3 μm and 20 μm, and extends, along the second axis Y, throughout the width of the first and the second movable masses 26, 27.

The bottom gap 66 extends between the coupling portion 60 of the first movable mass 26 and the detection portion 35 of the second movable mass 27, thus separating them from each other.

The bottom gap 66 has a width Dh2 along the first axis X, for example comprised between μm and 20 μm, and extends, along the second axis Y, throughout the width of the first and the second movable masses 26, 27.

In practice, the first movable mass 26 and the second movable mass 27 extend at a distance from each other. At the same time, the insulation regions 28 mechanically couple and electrically insulate the first and the second movable masses 26, 27 with each other.

Figure 5:
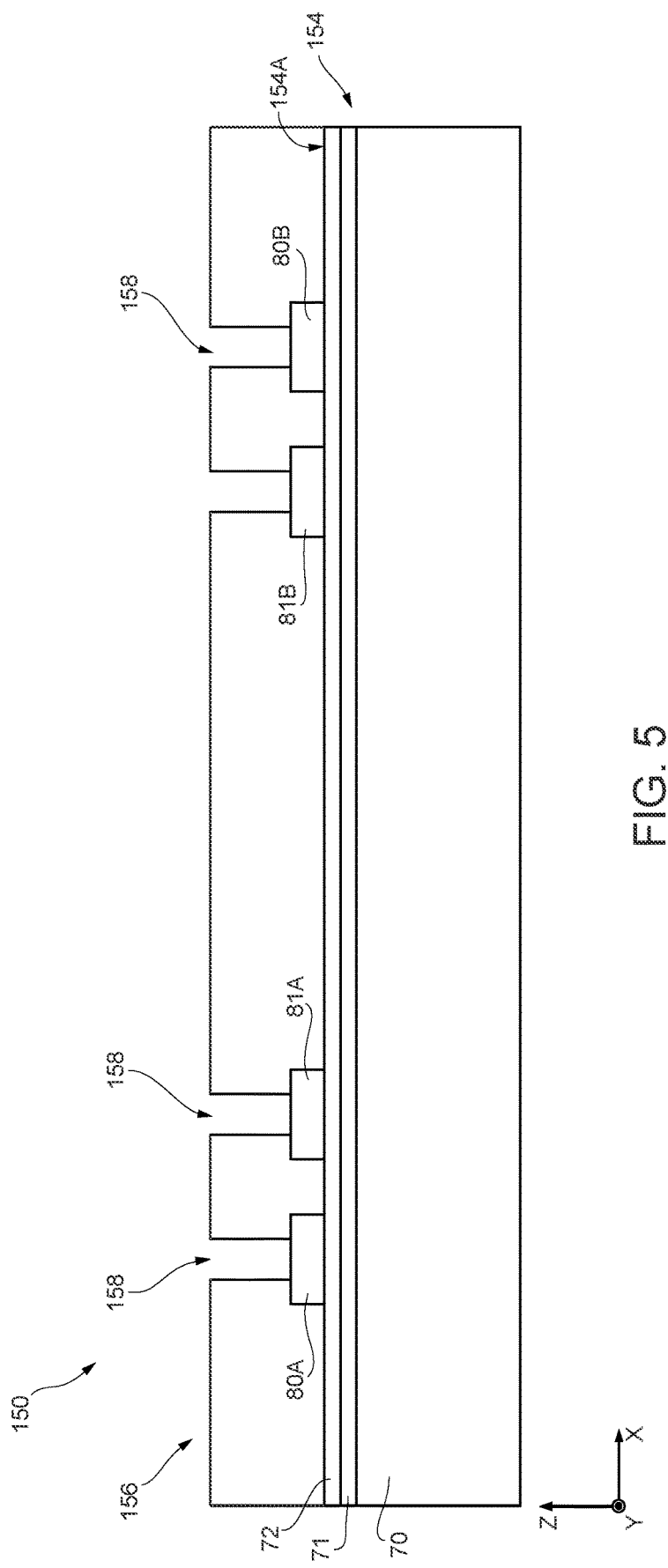
FIGS. 5-10 show cross-sections of the detection structure of FIG. 2, in successive manufacturing steps, along section-line III-III of FIG. 2.

With reference to FIG. 5, the substrate 24 is formed here by a support body 70, for example of semiconductor material such as silicon, and by one or more insulating layers extending on the support body 70. In this embodiment, a first insulating layer 71, for example an oxide such as silicon oxide, extends directly on the support body 70 and a second insulating layer 72, for example a nitride such as silicon nitride, extends directly on the first insulating layer 71 and forms the surface 24A of the support body 24.

The detection structure 21 further comprises a first stator contact pad 75, electrically coupled to the first stator electrode 40 and to the third stator electrode 43 by a first conductive track 80, and a second stator contact pad 76, electrically coupled to the second stator electrode 41 and to the fourth stator electrode 44 by a second conductive track 81.

The first and the second conductive tracks 80, 81, for example of polysilicon, extend on the surface 24A of the substrate 24.

The first conductive track 80 is formed by a first portion 80A, in direct electrical contact with the first stator electrode 40, a second portion 80B in direct electrical contact with the third stator electrode 43, and a third portion 80C in direct electrical contact with the first contact pad 75.

The portions 80A, 80B and 80C of the first conductive track 80 intersect in a node 82.

The second conductive track 81 is formed by a first portion 81A, in direct electrical contact with the second stator electrode 41, a second portion 81B in direct electrical contact with the fourth stator electrode 44, and a third portion 81C in direct electrical contact with the second contact pad 76.

The portions 81A, 81B and 81C of the second conductive track 81 intersect in a node 84.

With reference to FIG. 1, the control unit 22 comprises a detection circuit 93 and a drive circuit 94, mutually coupled.

The first and the second stator contact pads 75, 76 are electrically coupled to the detection circuit 92 through respective electrical connection means, for example bond wires or in another manner per se known, represented only schematically in FIG. 2 and indicated respectively by 78, 79.

The detection unit 21 further comprises a first rotor contact pad 86, electrically coupled to the first movable mass 26 by a third conductive track 87, and a second rotor contact pad 88, electrically coupled to the second movable mass 27 by a fourth conductive track 89.

The third and the fourth conductive tracks 87, 88, for example of polysilicon, extend on the surface 24A of the substrate 24, in direct electrical contact with a respective first anchoring region and, respectively, a respective second anchoring region 30B.

The first and the second rotor contact pads 86, 88 are electrically coupled to the drive circuit 93 through respective electrical connection means, for example bond wires or in another manner known per se, represented only schematically in FIG. 2 and indicated respectively by 90, 91.

In use, the drive circuit 93 provides a first reading signal $V_{r1}$ to the first rotor pad 86 and a second reading signal $V_{r2}$ to the second rotor pad 88.

The first and the second reading signals $V_{r1}$, $V_{r2}$ are periodic signals, for example square wave signals, having a high frequency, for example comprised between 10 kHz and 1 MHz.

In detail, the detection structure 21 has a resonance frequency which is a function of the dimensions of the first and the second movable masses 26, 27, of the distances g1-g4 and of the elastic constant of the flexures 32A, 32B. For example, the resonance frequency of the detection structure 21 may be comprised between 0.2 kHz and 20 kHz.

In practice, the frequency of the first and the second reading signals $V_{r1}$, $V_{r2}$ is greater, in particular much greater, than the resonance frequency of the detection structure 21.

In detail, the first and the second reading signals $V_{r1}$, $V_{r2}$ are phase-shifted from each other by 180°.

The detection circuit 92 receives a first detection signal $S_{d1}$ from the first stator pad 75 and a second detection signal $S_{d2}$ from the second stator pad 76.

The detection circuit 92 is configured, in a per se known manner, to process the first and the second detection signals $S_{d1}$, $S_{d2}$ and obtain an acceleration value to which the MEMS accelerometer is subject. For example, the detection circuit 92 may be configured to operate a differential reading, from the first and the second detection signals $S_{d1}$, $S_{d2}$.

At rest, both the first and the second detection signals $S_{d1}$, $S_{d2}$ indicate a null acceleration value.

When the MEMS accelerometer 20 is subject to an acceleration along the first axis X, the first and the second movable masses 26, 27 move along the first axis X.

Figure 4:
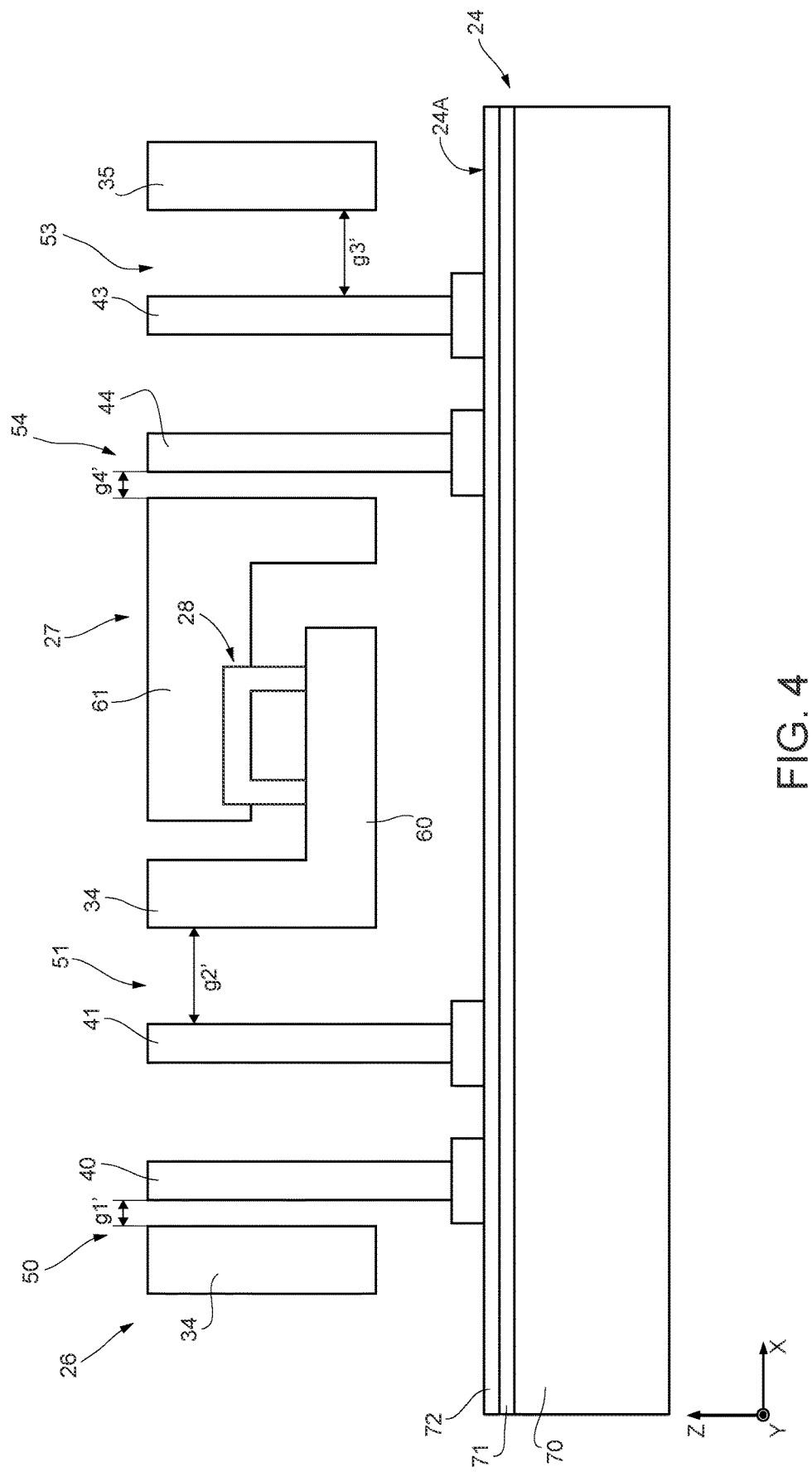
FIG. 4 shows a cross-section of the detection structure of FIG. 2, in use, along section line III-III of FIG. 2.

For example, FIG. 4 shows, by way of example, a situation wherein the first and the second movable masses 26, 27 have undergone a displacement Δx, along the first axis X, to the right.

Since the first and the second movable masses 26, 27 are integral with each other, owing to the insulation regions 28, the first and the second movable masses 26, 27 undergo the same displacement Δx.

With reference to the example of FIG. 4, the detection portion 34 of the first movable mass 26 move towards the first stator electrode 40 and the detection portion 35 of the second movable mass 27 moves away from the third stator electrode 43.

At the same time, the detection portion 34 of the first movable mass 26 moves away from the second stator electrode 41 and the detection portion 35 of the second movable mass 27 moves towards the fourth stator electrode 44.

Therefore, again with reference to the example of FIG. 4, the detection portion 34 of the first movable mass 26 is at a distance $g_1'=g_1-\Delta x$ from the first stator electrode 40, and at a distance $g_2'=g_2+\Delta x$ from the second stator electrode 41. The detection portion 35 of the second movable mass 27 is at a distance $g_3'=g_3+\Delta x$ from the third stator electrode 43, and at a distance $g_4'=g_4-\Delta x$ from the fourth stator electrode 44.

A capacitance variation ΔC of the detection capacitors 50, 51, 53, 54 is associated with the displacement Δx.

In detail, the first detection capacitor 50 has a capacitance $C_1=C_0+\Delta C$, the second detection capacitor 51 has a capacitance $C_2=C_0-\Delta C$, the third detection capacitor 53 has a capacitance $C_3=C_0-\Delta C$, and the fourth detection capacitor 54 has a capacitance $C_4=C_0+\Delta C$.

Figure 4A:
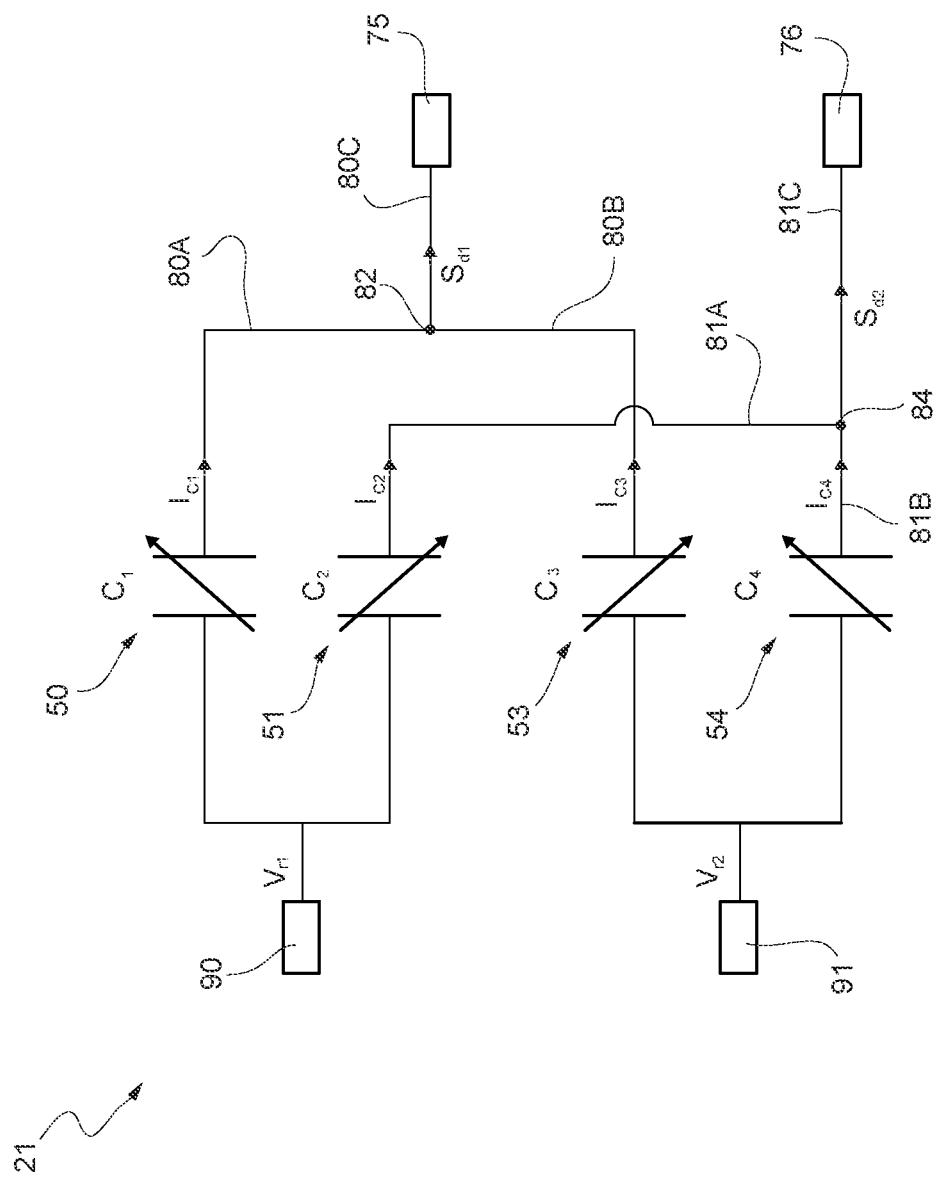
FIG. 4A shows an electrical equivalent of the detection structure of FIG. 2, in use.

By way of illustration, FIG. 4A shows an electrical equivalent of the detection structure 21, in use, with reference to the example of FIG. 4.

A current $I_{C1}$, which is a function of the product between the first reading signal $V_{r1}$ and the capacitance $C_1$ of the first detection capacitor 50, flows through the first portion 80A of the first conductive track 80. In detail, the current $I_{C1}$ has a common mode component, which is a function of the rest capacitance $C_0$, and a differential component, which is a function of the capacitance variation +ΔC.

A current $I_{C3}$, which is a function of the product between the second reading signal $V_{r2}$ and the capacitance $C_3$ of the third detection capacitor 53, flows through the second portion 80B of the first conductive track 80. In detail, the current Ica has a common mode component, which is a function of the rest capacitance $C_0$, and a differential component, which is a function of capacitance variation −ΔC.

At the node 82, the currents $I_{C1}$ and Ica add up, thus generating the first detection signal $S_{d1}$.

Since the first and the second reading signals $V_{r1}$, $V_{r2}$ are phase-shifted from each other, at the node 82, the common mode components of the currents $I_{C1}$ and $I_{C3}$ may be subtracted from each other and the differential components of the currents $I_{C1}$ and $I_{C3}$ may be added to each other.

In particular, if the first and the second reading signals $V_{r1}$, $V_{r2}$ are phase-shifted from each other by 180°, the common mode components may be cancelled and the differential components of the currents $I_{C1}$ and $I_{C3}$ may be added, in phase.

A similar discussion also applies to the second and the fourth detection capacitors 51, 54.

A current $I_{C2}$, which is a function of the product between the first reading signal $V_{r1}$ and the capacitance $C_2$ of the second detection capacitor 51, flows through the first portion 81A of the second conductive track 81. In detail, the current $I_{C2}$ has a common mode component, which is a function of the rest capacitance $C_0$, and a differential component, which is a function of the capacitance variation −ΔC.

A current $I_{C4}$, which is a function of the product between the second reading signal $V_{r2}$ and the capacitance $C_4$ of the fourth detection capacitor 54, flows through the second portion 81B of the second conductive track 81. In detail, the current $I_{C4}$ has a common mode component, which is a function of the rest capacitance $C_0$, and a differential component, which is a function of the capacitance variation +ΔC.

At the node 84, the currents $I_{C2}$ and $I_{C4}$ add up, thus generating the second detection signal $S_{d2}$.

Similarly to what has been described above, at the node 84 the common mode components may thus be cancelled and the differential components of the currents $I_{C2}$ and $I_{C4}$ may be added, in phase.

In practice, the detection structure 21 allows the common mode component of the first and the second detection signals $S_{d1}$, $S_{d2}$ output from the detection structure 21, to be eliminated, at die level.

This allows the design of the detection circuit 92 to be simplified; for example, the detection circuit 92 does not need a specific module for cancelling the common mode component of the detection signals Sal, $S_{d2}$.

Therefore, the MEMS accelerometer 20 may have low energy consumption and low cost.

Furthermore, the fact that the first and the second masses 26, 27 are insulated from each other from an electrical point of view and coupled to each other from a mechanical point of view through the insulation regions 28, allows any mechanical offsets of the detection structure 21, caused by process variations, to be compensated. In detail, the detection structure 21 allows to compensate any deviation, with respect to what has been designed, between the first and the second movable masses 26, 27 and between the flexures 32A, 32B.

In particular, the fact that the first and the second movable masses 26, 27 are rigidly coupled to, or integral with, each other, causes the first and the second movable masses 26, 27 to undergo a same displacement, with respect to the substrate 24, in response to an acceleration of the MEMS accelerometer 20. In practice, the first and the second movable masses 26, 27 behave, from a mechanical point of view, as a single movable body; at the same time, the first and the second movable masses 26, 27 form distinct electrical domains of the single movable body, which may therefore be biased independently one from the other.

Consequently, the detection structure 21 causes, in response to an acceleration of the MEMS accelerometer 20, the first detection capacitor 50 and the third detection capacitor 53 to have, in magnitude, a same capacitance variation. Similarly, also the second detection capacitor 51 and the fourth detection capacitor 54 may have, in magnitude, a same capacitance variation.

Therefore, the detection structure 21 allows a high detection accuracy of an acceleration of the MEMS accelerometer 20 to be obtained.

Furthermore, the fact that the detection structure 21 also provides, at output, the second detection signal $S_{d2}$, in addition to the first detection signal $S_{d1}$, allows the detection circuit 92 to perform a differential electrical measurement of the acceleration to which the MEMS accelerometer is subject, further increasing the detection accuracy thereof.

Manufacturing steps that lead to the formation of the detection structure 21 of the MEMS accelerometer 20 are described hereinafter with reference to FIGS. 5-9.

FIG. 5 shows, in the Cartesian reference system XYZ, a work body 150 formed by a work substrate 154 having a surface 154A. The work substrate 154 is intended to form the substrate 24 of the detection structure 21 and is formed by the support body 70, the first insulating layer 71 and the second insulating layer 72.

The stator conductive tracks 80, 81 and the rotor conductive tracks, not shown here, have already been formed on the surface 154A of the work substrate 154.

Furthermore, a first sacrificial layer 156, for example of oxide such as silicon oxide, has already been formed on the work body 150.

The first sacrificial layer 156 extends on the surface 154 of the work wafer 154 and, partially, on the conductive tracks 80, 81.

The first sacrificial layer 156 has already been defined so as to form a plurality of vias 158 each exposing a portion of a respective conductive track 80, 81.

Figure 6:
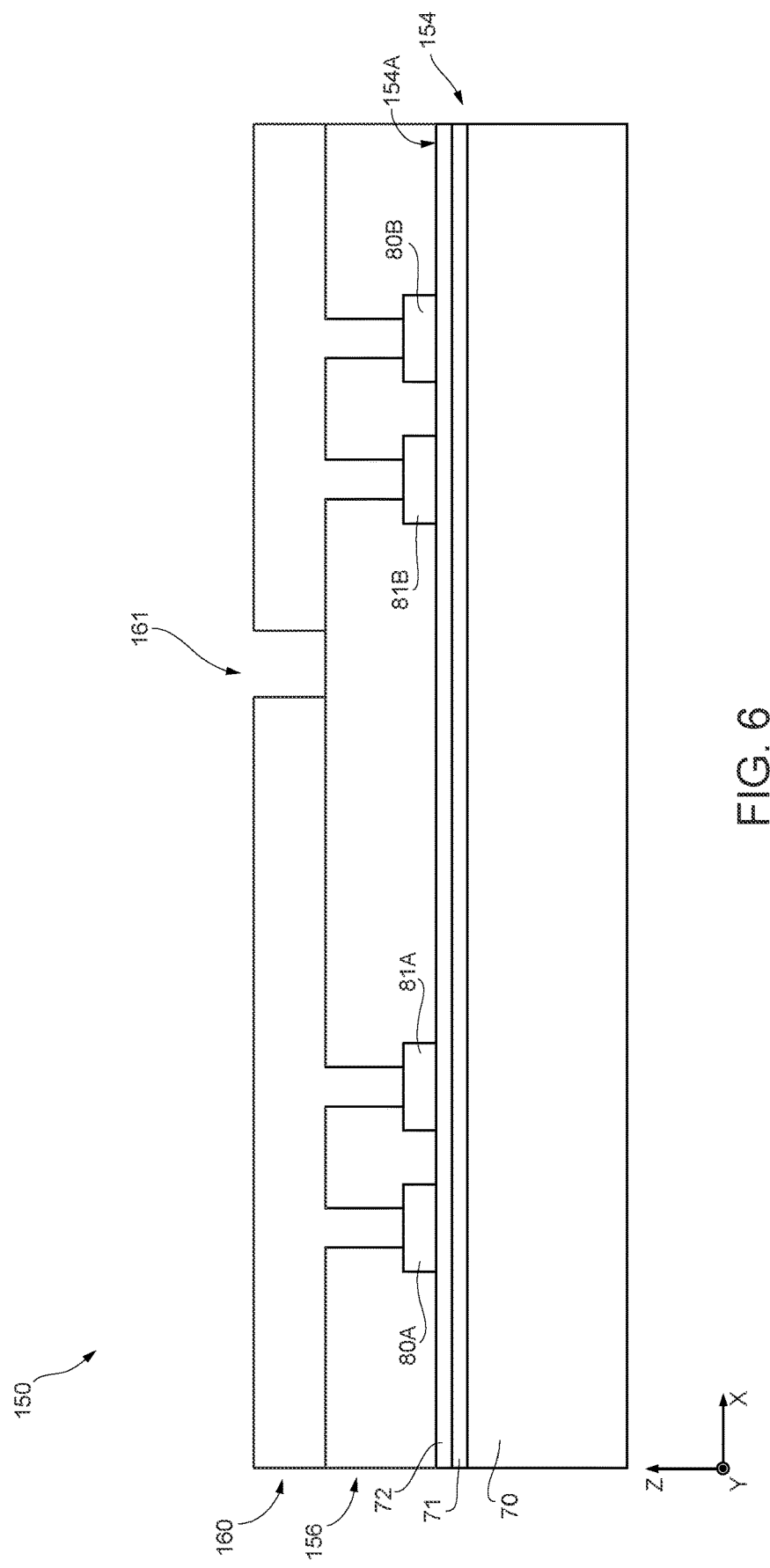

Subsequently, FIG. 6, a first structural layer 160, for example of silicon or polysilicon, is formed on the work body 150. For example, the first structural layer 160 is grown on the work body 150, from the conductive tracks 80, 81.

The first structural layer 160 extends over the first sacrificial layer 156 and into the vias 158.

Furthermore, a window 161 is formed through the first structural layer 160, where the bottom gap 66 is intended to be formed.

Figure 7:
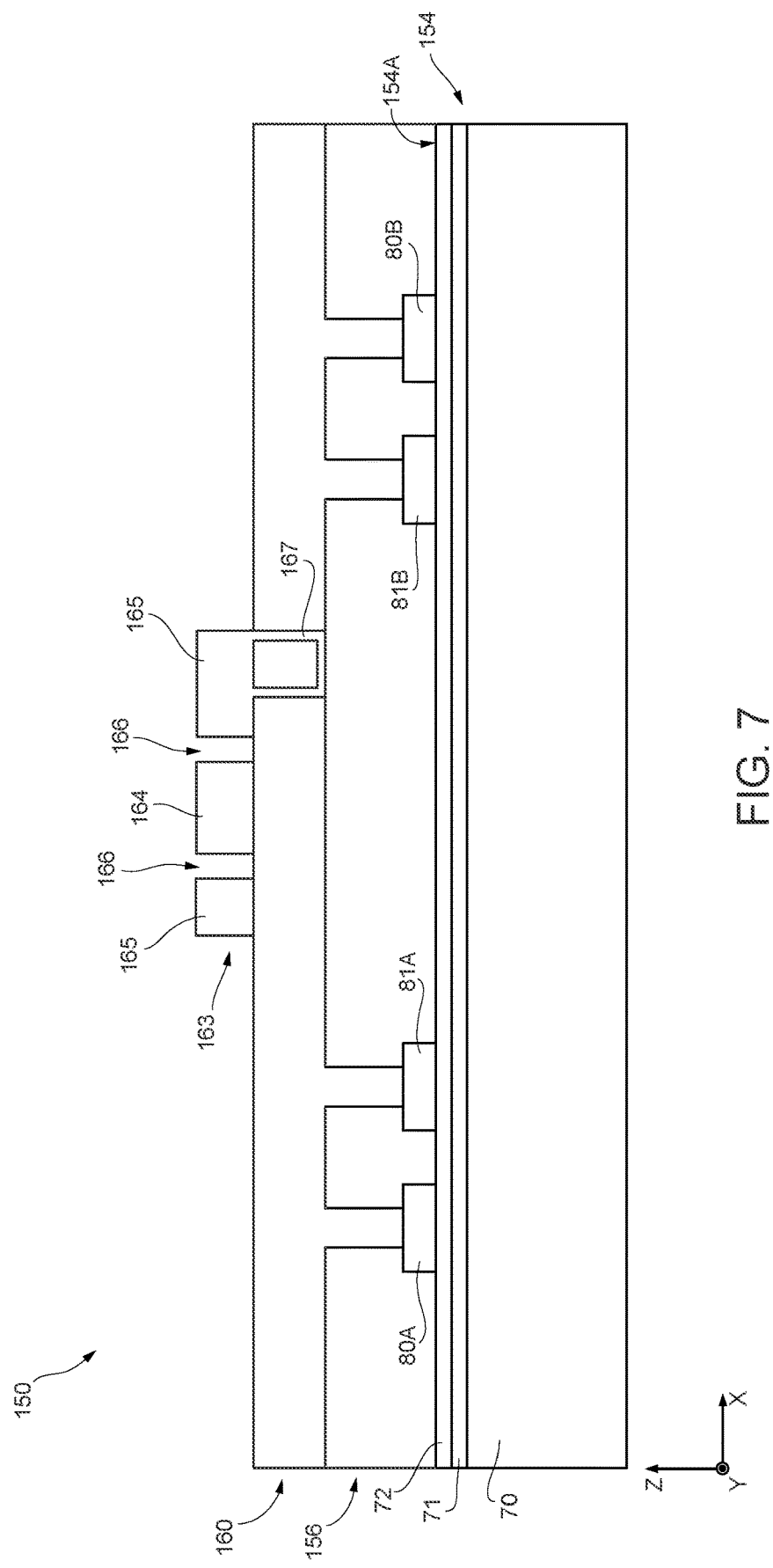

Then, FIG. 7, a second sacrificial layer 163, for example of oxide such as silicon oxide, is formed on the work body 150, over the first structural layer 160.

The second sacrificial layer 163 is also defined, again with reference to FIG. 7, so as to form a separation portion 164 (intended to form the separation portion 28A of the insulation regions 28) and sacrificial portions 165, useful to form the vertical gap 56.

The separation portion 164 extends at a distance from the sacrificial portions 165. In practice, a trench 166 is formed which extends around the separation portion 164.

The second sacrificial layer 163 also comprises a further sacrificial portion 167 which extends partially inside the window 161, on the walls of the first structural layer 160 and on the first sacrificial layer 156.

Figure 8:
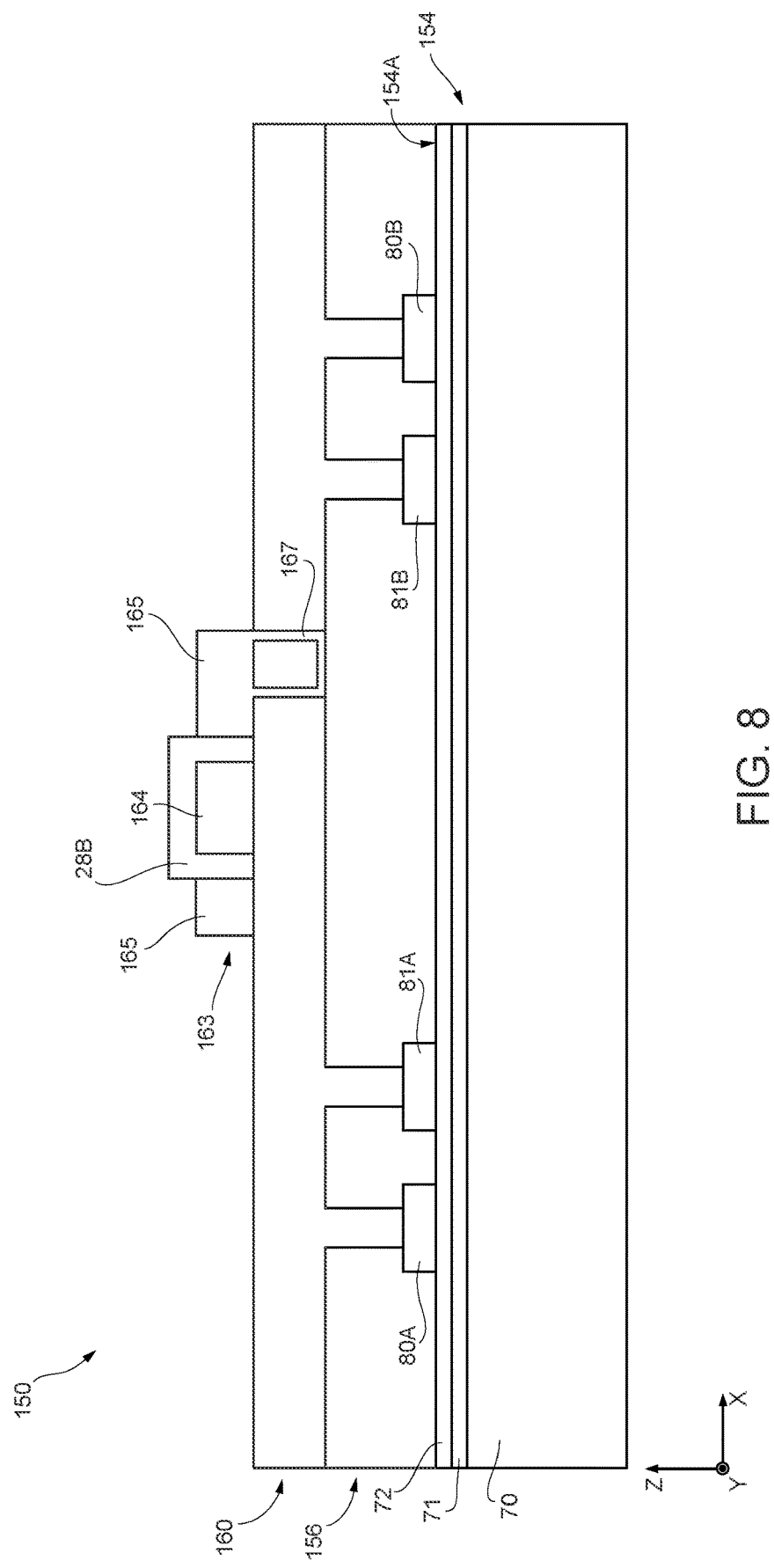

The coating portion 28B of the insulation regions 28 is formed, FIG. 8, on the work body 150. The coating portion 28B extends over the separation portion 164 and into the trench 166, between the separation portion 164 and the sacrificial portions 165.

In practice, the coating portion 28B completely surrounds the separation portion 164.

The coating portion 28B is of electrically insulating material, different from the first and the second sacrificial layers 156, 163. In detail, the first and the second sacrificial layers 156, 163 may be removed using an etching material, for example hydrofluoric acid (HF) in case the first and the second sacrificial layers 156, 163 are of silicon oxide. The coating portion 28B is such that it is not etched by such etching material.

For example, if the first and the second sacrificial layers 156, 163 are of silicon oxide, the coating portion 28B may be of nitride, in particular silicon nitride.

Figure 9:
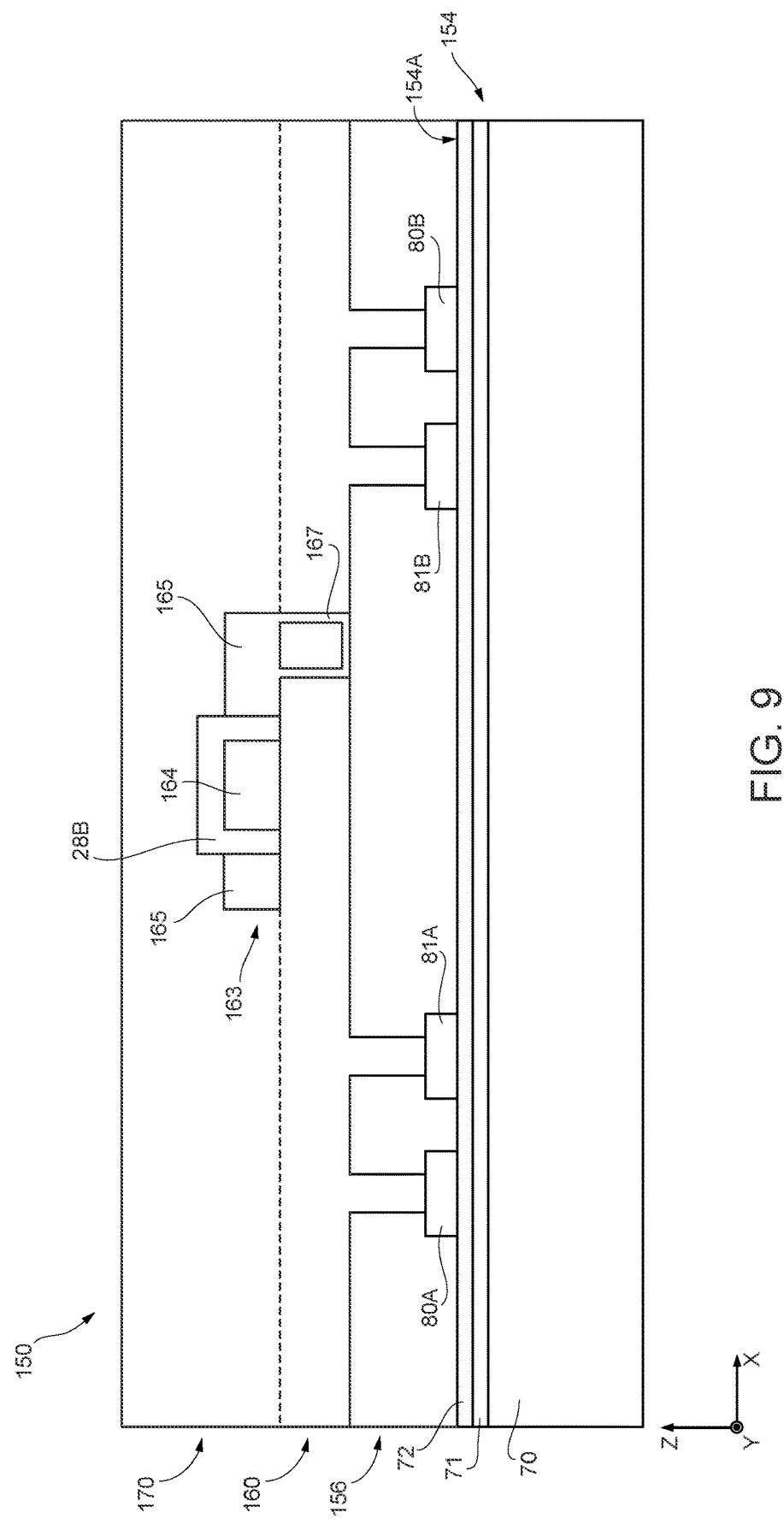

Subsequently, FIG. 9, a second structural layer 170, for example of silicon or polysilicon, is formed on the work body 150.

The second structural layer 170 may be of a material equal to or different from, here equal to, the first structural layer 160.

In detail, the second structural layer 170 extends on the first structural layer 160 (from which it is separated by a dashed line in FIG. 9), on the second sacrificial layer 163 and on the coating region 28B.

Figure 10:
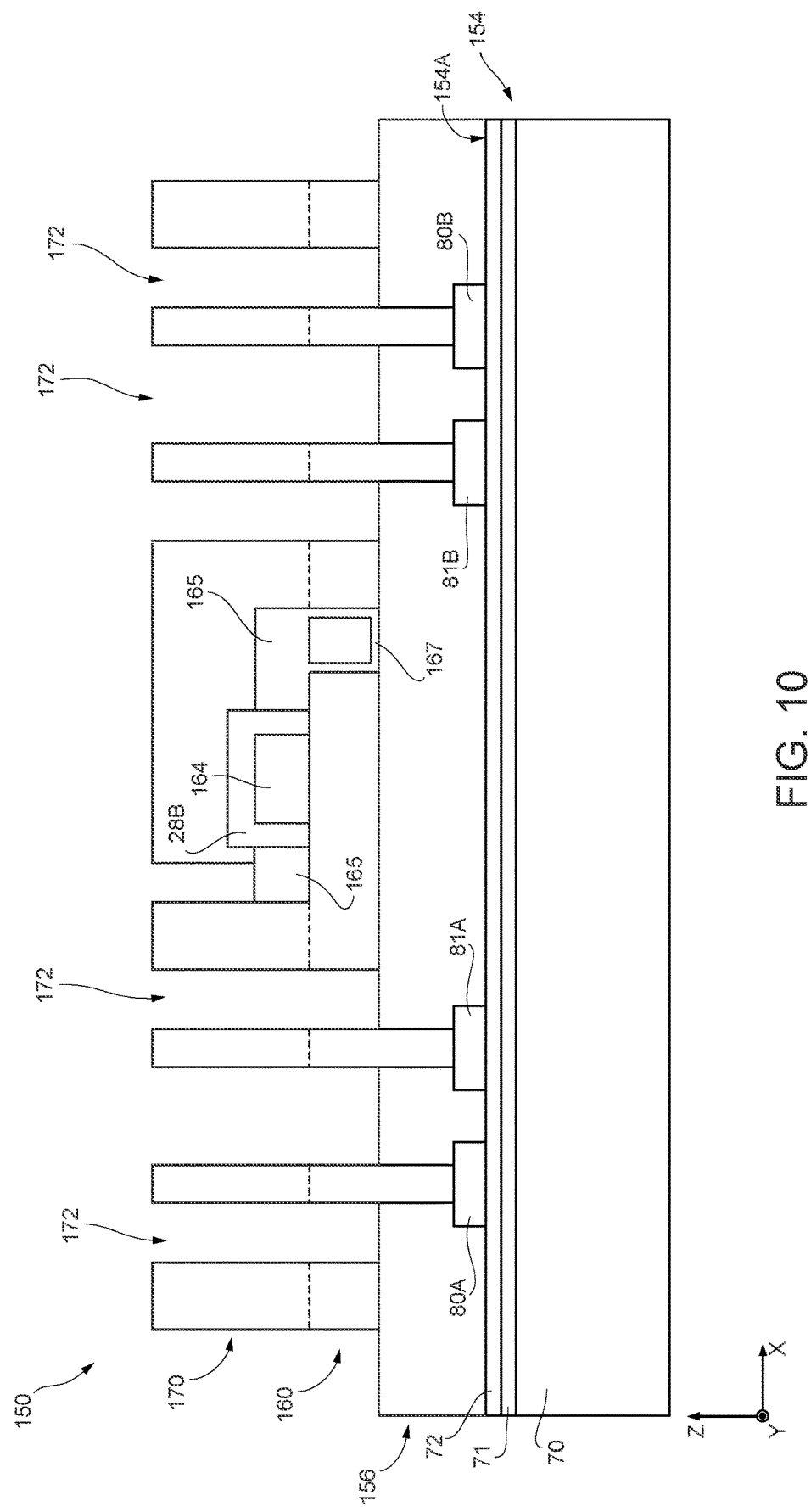

Then, FIG. 10, a plurality of windows 172 are formed through the first and the second structural layers 160, 170, FIG. 10, through known lithography and etching steps, up to the first sacrificial layer 156.

In detail, the windows 172 form the portions of the first and the second structural layers 160, 170 which are intended to form the first movable mass 26, the second movable mass 27, the stator electrodes 40, 41, 43, 44, the flexures 32A, 32B, and the anchoring regions 30A, 30B.

Subsequently, the support body 150 is subject to an etching, not shown here, which removes the first sacrificial layer 156 and the sacrificial portions 165, 167 of the second sacrificial layer 163, thus forming the detection structure 21 of FIGS. 2 and 3.

For example, in case the first and the second sacrificial layers 156, 163 are of silicon oxide, their removal may be performed through an etching based on hydrofluoric acid (HF).

The separation portion 164 of the second sacrificial layer 163 is masked by the coating portion 28B and therefore is not removed.

Further manufacturing steps follow, not shown here and per se known, for example dicing of the work substrate 154 and packaging, which lead to the formation of the detection structure 21.

Furthermore, the detection structure 21 may also be electrically connected, in a per se known manner, to the control unit 22, thus forming the MEMS accelerometer 20.

Figure 11:
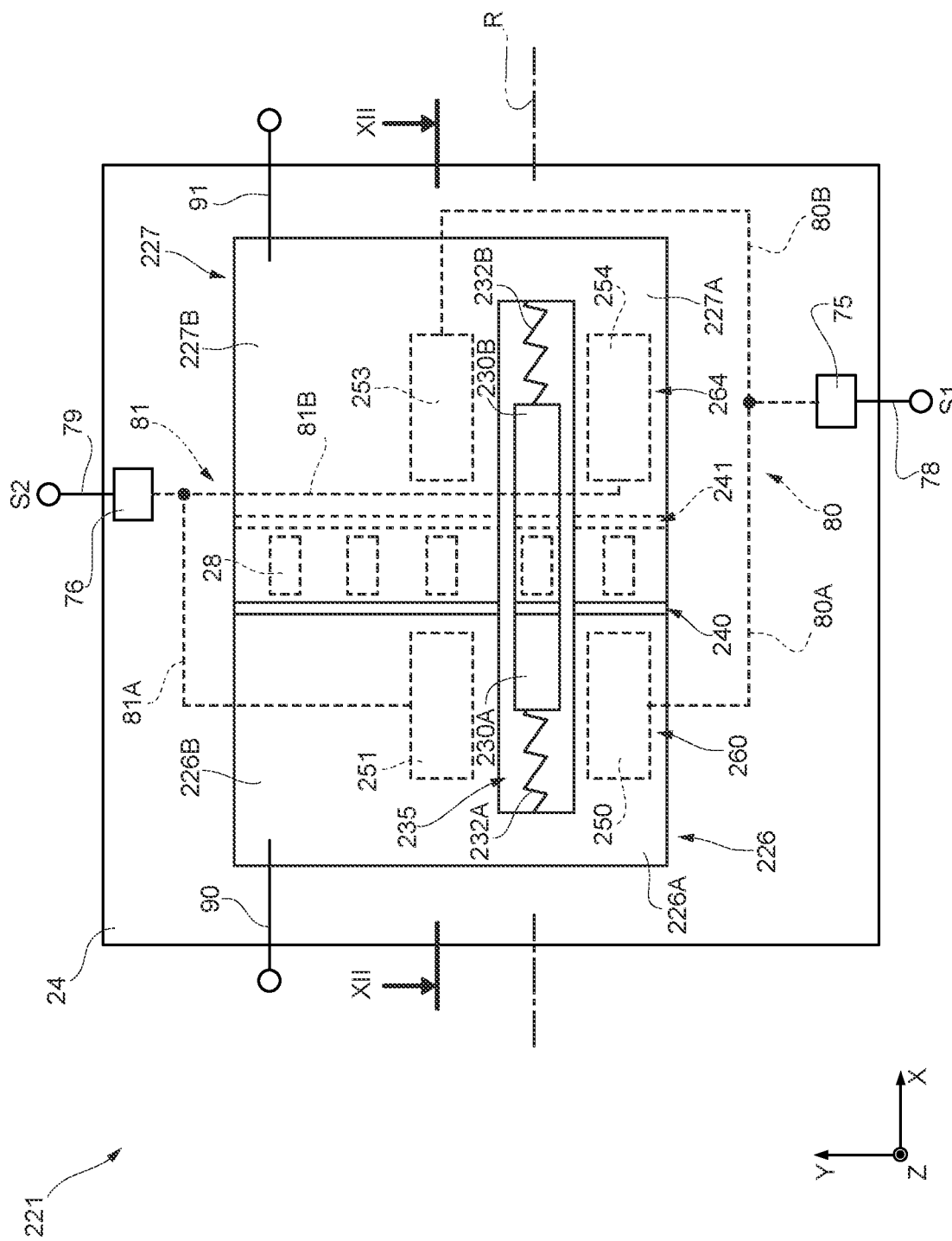
FIG. 11 shows a top-plan view of the detection structure of FIG. 1, according to a different embodiment.
Figure 12:
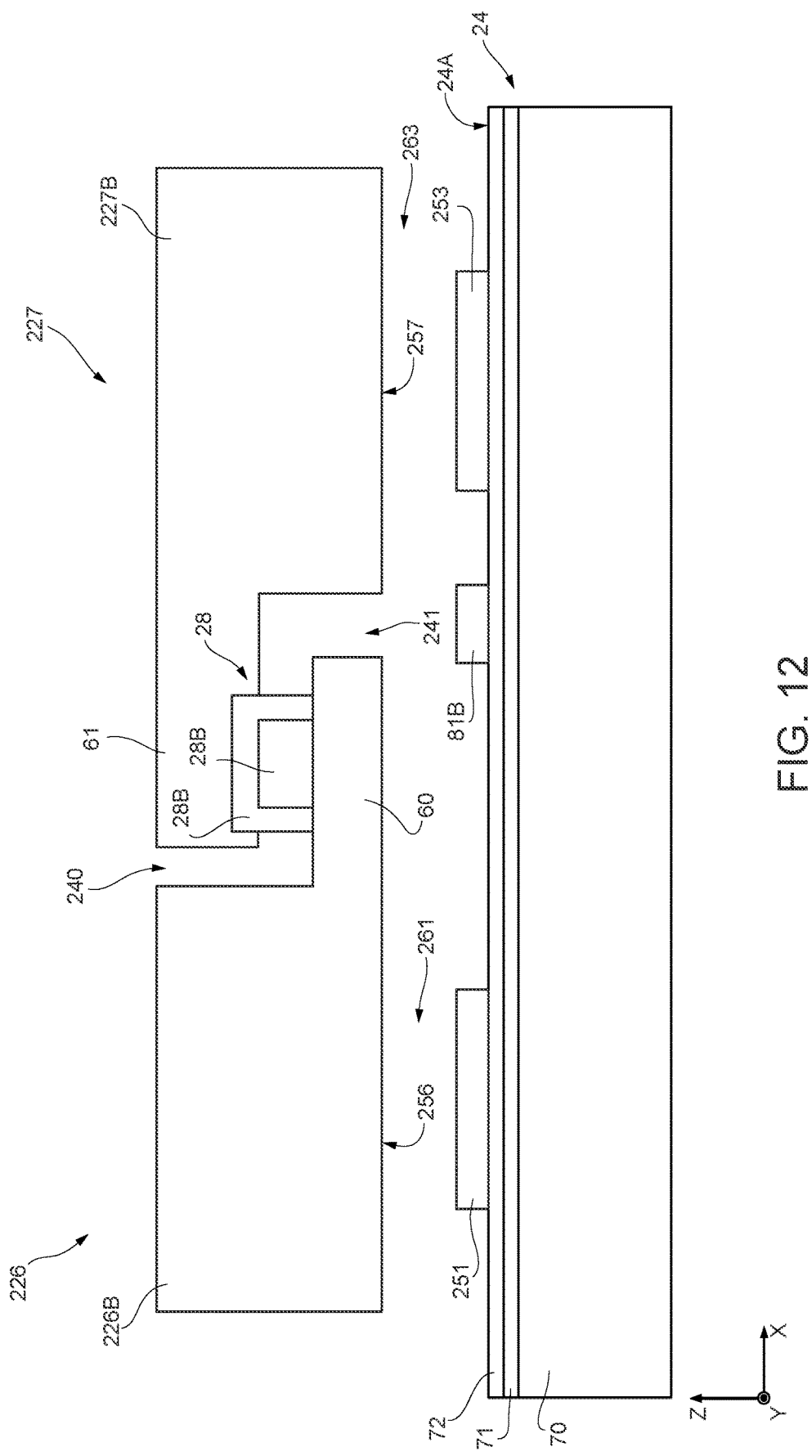
FIG. 12 shows a cross-section of the detection structure of FIG. 11, at rest, along a section line XII-XII of FIG. 11.

FIGS. 11 and 12 show a different embodiment of the detection structure, indicated here by 221, of the MEMS accelerometer 20 of FIG. 1.

The detection structure 221 has a general structure similar to that of the detection structure 21 of FIGS. 2 and 3; consequently, elements in common are indicated by the same reference numerals and are not further described.

The detection structure 221 is configured to detect an acceleration of the MEMS accelerometer 20 along the third axis Z.

In detail, in this embodiment, the detection structure 221 has a teeter-totter structure having a rotation axis R parallel to the first axis X.

The detection structure 221 comprises the substrate 24 formed by the support body 70 and by the first and the second insulating layers 71, 72.

The support structure 221 also here comprises a first and a second movable mass 226, 227, suspended on the substrate 24 and mechanically coupled to each other by the insulation regions 28.

The first and the second movable masses 226, 227 are each elastically coupled to a respective anchoring region 230A, 230B through a respective flexure 232A, 232B.

In this embodiment, the flexures 232A, 232B, represented only schematically in FIG. 11, have a torsional degree of freedom, i.e., they allow a rotation movement of the first and the second movable masses 226, 227 about the rotation axis R.

In top-plan view, the first and the second movable masses 226, 227 are each substantially C-shaped, mirrored to each other with respect to an axis parallel to the second axis Y.

In detail, the first and the second movable masses 226, 227 laterally delimit an opening 235 extending along the rotation axis R. The opening 235 extends, along the third axis Z, throughout the thickness of the first and the second movable masses 226, 227.

The anchoring regions 230A, 230B and the flexures 232A, 232B are arranged in the opening 235 and extend along the rotation axis R.

The rotation axis R divides the first movable mass 226 into a respective smaller portion 226A and a respective greater portion 226B, and divides the second movable mass 227 into a respective smaller portion 227A and a respective greater portion 227B.

The smaller portions 226A, 227A extend on a first side of the rotation axis R and the greater portions 226B, 227B extend on a second side of the rotation axis R opposite to the first side along the second axis Y.

The smaller portions 226A, 227A each have a smaller mass than the respective greater portion 226B, 227B.

The first and the second movable masses 226, 227 also here each further comprise a respective coupling portion 60, 61.

Also in this embodiment, the coupling portions 60, 61 are arranged at a distance from each other along the third axis Z and the insulation regions 28 each extend between the coupling portion of the first movable mass 226 and the coupling portion 61 of the second movable mass 227, along the third axis Z.

In detail, the coupling portion 60 extends from the smaller portion 226A and from the greater portion 226B of the first movable mass 226, at a first height along the third axis Z from the substrate 24, towards the second movable mass 227. The coupling portion 61 extends from the smaller portion 227A and from the greater portion 227B of the second movable mass 227, at a second height along the third axis Z from the substrate 24, towards the first movable mass 226. The second height is greater than the first height.

Also in this embodiment, the first and the second movable masses 226, 227 are separated, along the first axis X, by a top gap, here indicated by 240, and by a bottom gap, here indicated by 241.

The top gap 240 extends between the first movable mass 226 and the coupling portion 61 of the second movable mass 227. The bottom gap 241 extends between the second movable mass 227 and the coupling portion 60 of the first movable mass 226.

In this embodiment, the anchoring regions 230A, 230B are rigidly coupled to each other by a respective coupling region 28. Therefore, the anchoring regions 230A, 230B are electrically insulated from each other.

Furthermore, the anchoring regions 230A, 230B each comprise a respective portion, not shown here in detail, equal to the coupling portion 60 of the first movable mass 226 and, respectively, to the coupling portion 61 of the second movable mass 227.

The detection structure 221 further comprises a first and a second stator electrode 250, 251, for example of polysilicon, extending on the surface 24A of the substrate 24 at a distance, along the third axis Z, from the first movable mass 226, and a third and a fourth stator electrode 253, 254, for example of polysilicon, extending on the surface 24A of the substrate 24 at a distance, along the third axis Z, from the second movable mass 227.

In detail, the first stator electrode 250 faces a bottom surface, not shown here, of the smaller portion 226A of the first movable mass 226, and the second stator electrode 251 faces a bottom surface 256 of the greater portion 226B of the first movable mass 226.

The third stator electrode 253 faces a bottom surface 257 of the greater portion 227B of the second movable mass 227, and the fourth stator electrode 254 faces a bottom surface, not shown here, of the smaller portion 227A of the second movable mass 227.

In practice, the first stator electrode 250 is capacitively coupled to the smaller portion 226A of the first movable mass 226, forming a first detection capacitor 260; the second stator electrode 251 is capacitively coupled to the greater portion 226B of the first movable mass 226, forming a second detection capacitor 261; the third stator electrode 253 is capacitively coupled to the greater portion 227B of the second movable mass 227, forming a third detection capacitor 263; and the fourth stator electrode 254 is capacitively coupled to the smaller portion 227A of the second movable mass 227, forming a fourth detection capacitor 264.

In practice, the bottom surfaces of the first and the second movable masses 126, 127 here form four rotor electrodes each coupled to a respective stator electrode.

At rest, the detection capacitors 260, 261, 263 and 264 have, in this embodiment, a same rest capacitance $C_0$; however, they may have rest capacitances different from each other, depending on the specific application.

The detection structure 221 further comprises the first stator contact pad 75, electrically coupled to the first stator electrode 250 and to the third stator electrode 253 by the first conductive track 80, and the second stator contact pad 76, electrically coupled to the second stator electrode 251 and to the fourth stator electrode 254 by the second conductive track 81.

The electrical connection means 78, 79 electrically couple the first and, respectively, the second stator contact pad 75, 76 to the detection circuit 92; and the electrical connection means 90, 91 electrically couple the first and, respectively, the second movable mass 226, 227 to the drive circuit 93, in a manner not shown here in detail and known per se.

In use, similarly to what has been described for the detection structure 21 of FIG. 2, the drive circuit 93 provides the first and the second reading signals $V_{r1}$, $V_{r2}$ to the first movable mass 226 and, respectively, to the second movable mass 227. The detection circuit 92 receives the first detection signal $S_{d1}$ from the first stator pad 75 and the detection signal $S_{d2}$ from the second stator pad 76.

When the MEMS accelerometer 20 is subject to an acceleration along the third axis Z, the first and the second movable masses 226, 227 undergo a rotation movement about the rotation axis R.

For example, the acceleration along the third axis Z may cause the greater portions 226B, 227B of the first and, respectively, the second movable mass 226, 227 to move towards the surface 24A of the substrate 24, and the smaller portions 226A, 227A of the first and, respectively, the second movable mass 226, 227 to move away from the surface 24A of the substrate 24.

In that case, the first and the fourth detection capacitors 260, 264 will undergo a capacitance decrease with respect to the rest capacitance $C_0$, and the second and the third detection capacitors 261, 263 will undergo a capacitance increase with respect to the rest capacitance $C_0$.

The fact that the first conductive track 80 electrically connects the first stator electrode 250 and the third stator electrode 253 to each other allows the common mode component of the first detection signal $S_{d1}$ to be cancelled, at die level, as described with reference to FIGS. 4 and 4A.

Similarly, the fact that the second conductive track 81 electrically connects the second stator electrode 251 and the fourth stator electrode 254 to each other allows the common mode component of the second detection signal $S_{d2}$ to be cancelled at die level.

Therefore, the advantages discussed with reference to the detection structure 21 also apply to the detection structure 221, i.e., in case the MEMS accelerometer 20 is configured to detect an acceleration along the third axis Z.

It will be clear to the person skilled in the art that the detection structure 221 may be formed in a similar manner, and therefore not further described herein, with respect to what has been discussed for the detection structure 21, with reference to FIGS. 5-19.

Finally, it is clear that modifications and variations may be made to the detection structure 21, 221, the manufacturing process and the MEMS accelerometer described and illustrated herein without thereby departing from the scope of the present disclosure, as defined in the attached claims.

For example, the MEMS accelerometer 20 may be of biaxial or triaxial type. In that case, the MEMS accelerometer may comprise multiple detection structures, suitably configured to each detect an acceleration along a respective axis. The detection structures may each be formed in a respective die or may be integrated in a same die.

For example, with reference to the detection structure 21 of FIGS. 2 and 3, the coupling portions 60, 61 of the first and, respectively, the second movable mass 26, 27 may extend at a same height, along the third axis Z, with respect to the surface 24A of the substrate 24, and facing each other along the first or the second axes X, Y. Consequently, in that case, the insulation regions 28 would extend between the first and the second movable masses 26, 27 along the first or the second axis X, Y, instead of along the third axis Z.

Similar considerations may also apply to the detection structure 221 of FIGS. 11 and 12.

The first and the second movable masses and the respective stator electrodes may have shape and configuration different from what has been shown; they may form, for example, interdigitated detection capacitors, instead of parallel-plate detection capacitors.

The detection structure may have a lower or higher number of stator electrodes.

For example, the MEMS accelerometer 20 may only comprise one stator pad. In that case, for example with reference to the reference structure 21, the reference structure 21 may comprise only the first and the third stator electrodes 40, 43, or only the second and the fourth stator electrodes 41, 44.

Alternatively, the MEMS accelerometer 20 may comprise the first and the second stator pads 76, but the detection structure may comprise a greater number of stator electrodes, with respect to what has been described and illustrated, suitably electrically connected to each other. For example, with reference to the detection structure 21, the first and the second movable masses 26, 27 may have a greater number of openings 36, 37, each accommodating further stator electrodes.

Finally, the described embodiments may be combined to form further solutions. A detection structure (21; 221) for a MEMS accelerometer (20), may be summarized as including a substrate (24); a first movable mass (26; 226) and a second movable mass (27; 227), extending at a distance from each other, suspended on the substrate and configured to undergo a movement, with respect to the substrate, in response to an acceleration; a first movable electrode (34A, 34B; 256) integral with the first movable mass (26; 226); a second movable electrode (35B, 35A; 257) integral with the second movable mass (27; 227); a first fixed electrode (40, 41; 250, 251) integral with the substrate and configured to form, with the first movable electrode, a first variable capacitor (50, 51); a second fixed electrode (43, 44; 253, 254) integral with the substrate and configured to form, with the second movable electrode, a second variable capacitor (53, 54); and an insulation region (28), of electrically insulating material, suspended on the substrate and extending between the first movable mass and the second movable mass.

The insulation region (28) may mechanically couple the first movable mass and the second movable mass, so that the first movable mass may be integral with the second movable mass.

In response to the acceleration, the first variable capacitor may be configured to undergo a first capacitance variation $(+\Delta C)$ and the second variable capacitor may be configured to undergo a second capacitance variation $(-\Delta C)$ having opposite sign with respect to the first capacitance variation.

The detection structure may further include a detection contact pad (75, 76) integral with the substrate and a conductive track (80, 81) extending on the substrate between the first fixed electrode, the second fixed electrode and the detection contact pad.

The insulation region (28) may include a central portion (28A), of a first material, and a coating portion (28B), of a second material different from the first material, which covers, at least in part, the central portion.

The insulation region may include an oxide and a nitride.

The first and the second movable masses each may include a respective coupling portion (60, 61) facing each other, the insulation region (28) extending between the coupling portion of the first movable mass and the coupling portion of the second movable mass.

The coupling portion (60) of the first movable mass (26; 226) may extend at a first height from the substrate and the coupling portion (61) of the second movable mass (27; 227) may extend at a second height from the substrate different from the first height.

The first movable mass may include an opening (36) and an internal wall (34A, 34B) forming the first movable electrode, and the second movable mass may include an opening (37) and an internal wall (35A, 35B) forming the second movable electrode, the first fixed electrode (40, 41) extending from the substrate through the opening (36) of the first movable mass, facing the internal wall of the first movable mass, the second fixed electrode (43, 44) extending from the substrate through the opening (37) of the second movable mass, facing the internal wall of the second movable mass.

The first movable mass (226) and the second movable mass (227) each may have a respective face (256, 257) facing the substrate (24) and may be configured to undergo, in response to the acceleration, a rotation movement about a rotation axis (R) passing through the first and the second movable masses, the first fixed electrode (250, 251) extending on the substrate, facing the face (256) of the first movable mass, the second fixed electrode (253, 254) extending on the substrate, facing the face (257) of the second movable mass.

The detection structure may further include a third movable electrode (34B; 256) integral with the first movable mass (26; 226); a fourth movable electrode (35B) integral with the second movable mass (27; 227); a third fixed electrode (41; 251) integral with the substrate and configured to form, with the third movable electrode, a third variable capacitor (51); and a fourth fixed electrode (44; 254) integral with the substrate and configured to form, with the fourth movable electrode, a fourth variable capacitor (54), wherein, in response to the acceleration, the third variable capacitor may be configured to undergo a third capacitance variation (+ΔC) and the fourth variable capacitor may be configured to undergo a fourth capacitance variation (−ΔC) having opposite sign to the third capacitance variation.

A MEMS accelerometer (20) may be summarized as including the detection structure and a control unit (22) electrically coupled to the detection structure, the control unit including a drive circuit (94) and a detection circuit (93), the drive circuit being configured to provide a first reading signal ($V_{r1}$) to the first variable capacitor (50, 51) and a second reading signal ($V_{r2}$) to the second variable capacitor (53, 54), the detection circuit being configured to receive, from the detection structure, a detection signal ($S_{d1}$, $S_{d2}$) indicative of the capacitance of the first and the second variable capacitors.

The first reading signal and the second reading signal may be phase-shifted from each other.

The detection structure may further include a third movable electrode (34B; 256) integral with the first movable mass (26; 226); a fourth movable electrode (35B) integral with the second movable mass (27; 227); a third fixed electrode (41; 251) integral with the substrate and configured to form, with the third movable electrode, a third variable capacitor (51); and a fourth fixed electrode (44; 254) integral with the substrate and configured to form, with the fourth movable electrode, a fourth variable capacitor (54), the drive circuit being configured to provide the first reading signal to the first movable electrode (34A) and to the third movable electrode (34B), and the second reading signal to the second movable electrode (35A) and to the fourth movable electrode (35B), the detection circuit being configured to receive the first detection signal from the first and the second fixed electrodes and a second detection signal from the third and the fourth fixed electrodes.

A process of manufacturing a detection structure (21; 221) for a MEMS accelerometer, may be may be summarized as including, from a work substrate (154): forming a first movable mass (26) and a second movable mass (27), extending at a distance from each other, suspended on the substrate and configured to undergo a movement, with respect to the substrate, in response to an acceleration; forming a first movable electrode (34A, 34B) integral with the first movable mass; forming a second movable electrode (35A, 35B) integral with the second movable mass; forming a first fixed electrode (40, 41) integral with the substrate and configured to form, with the first movable electrode, a first variable capacitor (50, 51); forming a second fixed electrode (43, 44) integral with the substrate and configured to form, with the second movable electrode, a second variable capacitor (53, 54); and forming an insulation region (28), of electrically insulating material, suspended on the substrate and extending between the first movable mass and the second movable mass.

Forming the first and the second movable masses and forming the first and the second movable electrodes may include forming a first sacrificial region (156) on the substrate (154); forming a first structural region (160) on the first sacrificial region; forming a second sacrificial region (165, 167) on the first structural region; forming a second structural region (170) on the first structural region and on the second sacrificial region; removing the second sacrificial region; and removing the first sacrificial region.

Forming an insulation region may include forming an insulation portion (164) from the second sacrificial region (163); and forming a coating layer (28B), of a material different from the material of the second sacrificial region, which covers the insulation portion, so that the insulation portion of the second structural layer remains unetched during the step of removing the second sacrificial region.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
  a detection structure for a MEMS accelerometer, comprising:
    a substrate;
    a first movable mass and a second movable mass separated from each other, suspended on the substrate;
    a first movable electrode within the first movable mass;
    a second movable electrode within the second movable mass;
    a first fixed electrode on the substrate and configured to form, with the first movable electrode, a first variable capacitor;
    a second fixed electrode on the substrate and configured to form, with the second movable electrode, a second variable capacitor; and
    an insulation region, of electrically insulating material, suspended on the substrate and extending between the first movable mass and the second movable mass.

2. The device of claim 1, wherein the insulation region mechanically couples the first movable mass and the second movable mass.

3. The device of claim 1, wherein, in response to an acceleration, the first variable capacitor is configured to undergo a first capacitance variation and the second variable capacitor is configured to undergo a second capacitance variation having opposite sign with respect to the first capacitance variation.

4. The device of claim 1, further comprising a detection contact pad on the substrate and a conductive track extending on the substrate between the first fixed electrode, the second fixed electrode and the detection contact pad.

5. The device of claim 1, wherein the insulation region comprises a central portion, of a first material, and a coating portion, of a second material different from the first material, the coating portion covering a part of the central portion.

6. The device of claim 1, wherein the insulation region comprises an oxide and a nitride.

7. The device of claim 1, wherein the first and the second movable masses each comprise a respective coupling portion, the coupling portion of the first movable mass facing the coupling portion of the second movable mass and the insulation region extending between the coupling portion of the first movable mass and the coupling portion of the second movable mass.

8. The device of claim 7, wherein the coupling portion of the first movable mass extends at a first height from the substrate and the coupling portion of the second movable mass extends at a second height from the substrate different from the first height.

9. The device of claim 1, wherein the first movable mass comprises a first opening and a first internal wall forming the first movable electrode, and the second movable mass comprises a second opening and a second internal wall forming the second movable electrode.

10. The device of claim 1, wherein the first fixed electrode extends from the substrate through an opening of the first movable mass and faces an internal wall of the first movable mass, the second fixed electrode extends from the substrate through an opening of the second movable mass and faces the internal wall of the second movable mass.

11. The device of claim 1, wherein the first movable mass and the second movable mass each have a respective face facing the substrate and are configured to undergo, in response to an acceleration, a rotation movement about a rotation axis, the rotation axis passing through the first and the second movable masses, the first fixed electrode extending on the substrate, facing the first movable mass, the second fixed electrode extending on the substrate, facing the second movable mass.

12. The device of claim 1, further comprising:
a third movable electrode within the first movable mass;
a fourth movable electrode within the second movable mass;
a third fixed electrode on the substrate and configured to form, with the third movable electrode, a third variable capacitor; and
a fourth fixed electrode on the substrate and configured to form, with the fourth movable electrode, a fourth variable capacitor,
wherein, in response to an acceleration, the third variable capacitor is configured to undergo a third capacitance variation and the fourth variable capacitor is configured to undergo a fourth capacitance variation having opposite sign to the third capacitance variation.

13. A device, comprising:
a MEMS accelerometer comprising:
a substrate;
a first movable mass on the substrate, the first movable mass including a first movable electrode;
a second movable mass on the substrate separated from the first movable mass, the second movable mass including a second movable electrode;
a first fixed electrode on the substrate;
a first variable capacitor comprising the first fixed electrode and the first movable electrode;
a second fixed electrode on the substrate;
a second variable capacitor including the second fixed electrode and the second movable electrode; and
an insulation region suspended on the substrate and extending between the first movable mass and the second movable mass; and
a control unit electrically coupled to a detection structure, the control unit including a drive circuit and a detection circuit.

14. The device of claim 13, wherein the drive circuit is configured to provide a first reading signal to the first variable capacitor and a second reading signal to the second variable capacitor and the detection circuit is configured to receive, from the detection structure, a detection signal indicative of the capacitance of the first and the second variable capacitors.

15. The device of claim 14, wherein the first reading signal and the second reading signal are phase-shifted from each other.

16. The device of claim 14, wherein the detection structure further comprises:
a third movable electrode within the first movable mass;
a fourth movable electrode within the second movable mass;
a third fixed electrode on the substrate and configured to form, with the third movable electrode, a third variable capacitor; and
a fourth fixed electrode on the substrate and configured to form, with the fourth movable electrode, a fourth variable capacitor.

17. The device of claim 16, wherein the drive circuit is configured to provide the first reading signal to the first movable electrode and to the third movable electrode and the second reading signal to the second movable electrode and to the fourth movable electrode, and the detection circuit is configured to receive the first detection signal from the first and the second fixed electrodes and a second detection signal from the third and the fourth fixed electrodes.

18. A method, comprising:
forming, on a substrate, a first movable mass and a second movable mass, separated from each other, suspended on the substrate;
forming a first movable electrode within the first movable mass;
forming a second movable electrode within the second movable mass;
forming a first fixed electrode on the substrate and configured to form, with the first movable electrode, a first variable capacitor;
forming a second fixed electrode on the substrate and configured to form, with the second movable electrode, a second variable capacitor; and
forming an insulation region, of electrically insulating material, suspended on the substrate and extending between the first movable mass and the second movable mass.

19. The method of claim 18, wherein the forming the first and the second movable masses and forming the first and the second movable electrodes comprises:
forming a first sacrificial region on the substrate;
forming a first structural region on the first sacrificial region;
forming a second sacrificial region on the first structural region, the second sacrificial region comprising a first material;
forming a second structural region on the first structural region and on the second sacrificial region;
removing the second sacrificial region; and
removing the first sacrificial region.

20. The method of claim 19, wherein the forming an insulation region comprises:
forming an insulation portion from the second sacrificial region; and
forming a coating layer, of a second material different from the first material of the second sacrificial region, the coating layer covering the insulation portion, the insulation portion of the second structural layer remaining unetched during the removing the second sacrificial region.

\* \* \* \* \*